United States Patent [19]

Kondo

[11] Patent Number: 4,661,846

[45] Date of Patent: Apr. 28, 1987

[54] APPARATUS FOR DETECTING A MOVEMENT OF A DIGITAL TELEVISION SIGNAL

[75] Inventor: Tetsujiro Kondo, Kanagawa, Japan

[73] Assignee: Sony Corporation, Tokyo, Japan

[21] Appl. No.: 773,078

[22] Filed: Sep. 6, 1985

[30] Foreign Application Priority Data

Sep. 7, 1984 [JP] Japan .............................. 59-187826
Sep. 10, 1984 [JP] Japan .............................. 59-189352

[51] Int. Cl.⁴ .......................................... H04N 7/12
[52] U.S. Cl. .................................... 358/165; 358/136
[58] Field of Search ....................... 358/105, 135, 136

[56] References Cited

U.S. PATENT DOCUMENTS 3,890,462 6/1975 Limb et al. ...................... 358/105 X
4,218,703 8/1980 Netravali et al. ............... 358/105 X
4,278,996 7/1981 Netravali et al. .................... 358/136

*Primary Examiner*—James J. Groody
*Assistant Examiner*—Victor R. Kostak
*Attorney, Agent, or Firm*—Lewis H. Eslinger; Alvin Sinderbrand

[57] ABSTRACT

Upon execution of the movement detection by way of a gradient method, the leftward and rightward sampling differences ΔEL and ΔER at a change extremal value point are used to detect the respective movements in the vertical and horizontal directions. The movement amounts detected are selectively fetched. Upon addition/subtraction of the frame difference, the sign of sample is held until the positive or negative sign of the sample which is obtained from the result of comparison between the sampling difference values before and after the sample is changed. The accurate movement detection is performed by controlling the addition/subtraction in response to the holding signal.

5 Claims, 25 Drawing Figures

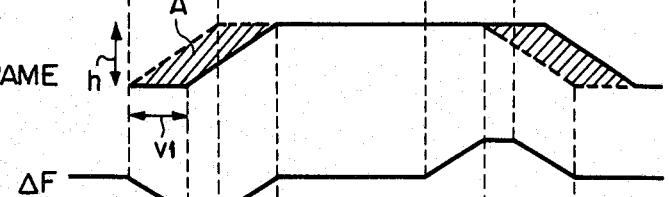
Fig.1A PREVIOUS FRAME
Fig.1B CURRENT FRAME
Fig.1C $\Delta F$
Fig.1D $\Delta E$
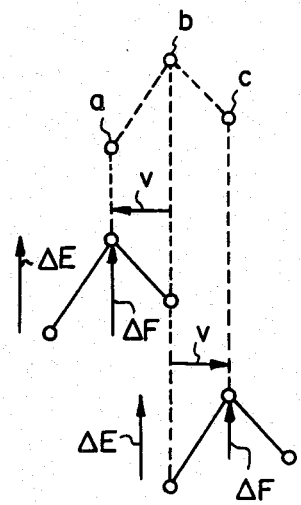
Fig. 3A PRIOR ART
Fig. 3B PRIOR ART
Fig. 3C PRIOR ART

APPARATUS FOR DETECTING A MOVEMENT OF A DIGITAL TELEVISION SIGNAL

FIELD OF THE INVENTION AND RELATED ART STATEMENT

The present invention relates to an apparatus for detecting a movement of a digital television signal.

In case of digitizing a television signal, efficient coding methods whereby the mean value of the number of bits per one pixel is reduced are considered. As one of those methods, a coding method between frames has been known. This coding method between frames includes a method by way of a movement correction. In this method, the positional relation information between the current frame and the previous frame (this information is called a "movement correction amount" or "movement vector") is obtained due to a movement detection and the coordination between frames is made by operating the image in the previous frame on the basis of the movement correction amount.

As an example of movement detecting apparatuses which can be applied to such a coding method between frames, there is an apparatus disclosed in the specification of U.S. Pat. No. 4,278,996. This detecting apparatus performs the movement detection by way of what is called a gradient method. Namely, as will be explained later, the movement amounts are calculated using the frame differences and gradient information (sampling differences with respect to the horizontal direction; line differences with regard to the vertical direction) regarding all pixels in the movement region.

As shown in FIG. 1A, it is now assumed that an image having intensity gradients horizontally moves in the direction indicated by an arrow (to the right) during one frame and arrives at the position of the current frame shown in FIG. 1B. When it is defined that the frame difference $\Delta F$ is "the difference which is derived by subtracting the intensity value of the pixel in the previous frame from the intensity value of the pixel in the current frame", the frame difference $\Delta F$ becomes as shown in FIG. 1C. The integration value of the frame difference $\Delta F$ equivalently corresponds to the area A of the hatched region in FIG. 1B. The area A is obtained as the product of the height h and movement amount $v_1$.

When it is defined that the differential horizontal pixel signal (hereinafter, simply referred to as a sampling difference) $\Delta E$ is "the difference which is derived by subtracting the intensity value of the previous sampling pixel from the intensity value of the current sampling pixel", the height h is equal to the integration value of the sampling difference $\Delta E$ (FIG. 1D); therefore, the magnitude of the horizontal movement amount $v_1$ is obtained by the following equation.

$$|v_1| = \Sigma|\Delta F| / \Sigma|\Delta E|$$

As is apparent from FIGS. 1C and 1D, in case of the movement to the right, the frame difference $\Delta F$ and sampling difference $\Delta E$ have different polarities from each other, namely, different signs. On the contrary, different from the case of FIGS. 1A to 1D, in case of the movement to the left, the frame difference $\Delta F$ and sampling difference $\Delta E$ have the same polarity with each other, namely, the same sign. The direction of movement can be known from the relation of sign. Therefore, when the sampling difference $\Delta E$ is positive (positive gradient), the integration to add the frame difference $\Delta F$ is performed and when the sampling difference $\Delta E$ is negative (negative gradient), the integration to subtract the frame difference $\Delta F$ is performed, and thereby obtaining the area A.

In this way, the horizontal movement amount $v_1$ having the direction is derived from the following equation.

$$v_1 = \Sigma\{\Delta F \cdot \text{sign}(\Delta E)\}/\Sigma|\Delta E|$$

where, the sign ($\Delta E$) becomes 0 when ($\Delta E = 0$) and becomes $\Delta E/|\Delta E|$ when ($\Delta E \neq 0$).

The above-mentioned concept can be also used even if the foregoing one-dimensional movement is extended to the two-dimensional movement. In other words, although the frame difference $\Delta F$ which is caused due to the vertical movement is newly added, the value of sign ($\Delta E$) is independent of the vertical movement; therefore, the influence on the horizontal direction by the frame difference $\Delta F$ which is caused due to the vertical movement is set off. When it is defined that the differential vertical pixel signal (hereinafter, simply referred to as a line difference) $\Delta L$ is "the difference which is obtained by subtracting the intensity value of the previous line pixel from the intensity value of the current line pixel", the vertical movement amount $v_2$ is obtained by the following equation.

$$v_2 = \Sigma\{\Delta F \cdot \text{sign}(\Delta L)\}/\Sigma|\Delta L|$$

Referring now to FIG. 2, there is shown a block diagram of an arrangement of a conventional apparatus to detect a two-dimensional movement. In FIG. 2, a digital television signal is supplied to an input terminal 61. This digital television signal is supplied to a frame delay circuit 62 having the delay amount of one frame, a sample delay circuit 64 having the delay amount of one sampling period, and a line delay circuit 66 having the delay amount of one line.

An output (pixel in the previous frame) of the frame delay circuit 62 is subtracted from the input digital television signal by a subtracter 63. The frame difference $\Delta F$ is generated from an output of the subtracter 63. An output (pixel of the previous sample) of the sample delay circuit 64 is subtracted from the input digital television signal by a subtracter 65. The sampling difference $\Delta E$ is generated from the output of the subtracter 65. An output (pixel of the previous line) of the line delay circuit 66 is subtracted from the input digital television signal by a subtracter 67. The line difference $\Delta L$ is generated from an output of the subtracter 67.

The frame difference $\Delta F$ is supplied to two integrators. One integrator consists of an adder/subtracter 71 and a register 72. The frame difference $\Delta F$ and an output of the register 72 are supplied to the adder/subtracter 71. The other integrator consists of an adder/subtracter 81 and a register 82. The frame difference $\Delta F$ and an output of the register 82 are supplied to the adder/subtracter 81. The frame difference $\Delta F$ is supplied to the adders/subtracters 71 and 81 of those integrators.

The adder/subtracter 71 performs the arithmetic operation of either addition or subtraction in response to an output of a control circuit 73. The sampling difference $\Delta E$ is supplied from the subtracter 65 to the control circuit 73. The control circuit 73 controls the adder/subtracter 71 so as to perform the adding operation when the sampling difference $\Delta E$ has a positive sign and to perform the subtracting operation when the sampling difference $\Delta E$ has a negative sign.

The adder/subtracter 81 performs the arithmetic operation of either addition or subtraction in response to an output of a control circuit 83. The line difference $\Delta L$ is supplied from the subtracter 67 to the control circuit 83. The control circuit 83 controls the adder/subtracter 81 so as to perform the adding operation when the line difference $\Delta L$ has a positive sign and to perform the subtracting operation when the line difference $\Delta L$ has a negative sign.

The sampling difference $\Delta E$ is supplied to a converter 74 and is converted to an absolute value and is supplied to one input of an adder 75 for integration. An output of the adder 75 is supplied to a register 76 and an output of the register 76 is supplied to the other input of the adder 75. Thus, the integration value of the absolute value of the sampling difference $\Delta E$ is fetched as the output of the register 76.

The line difference $\Delta L$ is supplied to a converter 84 and is converted to an absolute value and is supplied to one input of an adder 85 for integration. An output of the adder 85 is supplied to a register 86 and an output of the register 86 is supplied to the other input of the adder 85. Thus, the integration value of the absolute value of the line difference $\Delta L$ is fetched as the output of the register 86.

As described above, the horizontal movement $v_1$ is obtained by dividing the result of addition or subtraction of the frame difference $\Delta F$ in the movement region by the integration value of the absolute value of the sampling difference $\Delta E$ by a divider 77. This movement output $v_1$ can be derived from an output terminal 78. On the other hand, the vertical movement $v_2$ is obtained by dividing the result of addition or subrraction of the frame difference $\Delta F$ in the movement region by the integration value of the absolute value of the line difference $\Delta L$ by a divider 87. This movement output $v_2$ can be obtained from an output terminal 88.

The stationary property (continuity of $\Delta E$) is presumed in the movement detection by way of the foregoing gradient method; therefore, the extremal value which does not satisfy this condition becomes a cause of degradation of precision in the movement detection as explained hereinbelow.

As shown in FIG. 3A, assuming that the extremal value consisting of pixels a, b and c exists in the previous frame, when this extremal value moves to the left by one pixel in one frame (FIG. 3B), the frame difference $\Delta F$ becomes positive and the sampling difference $\Delta E$ becomes positive with regard to the pixel b. Since the signs of both of those differences are the same, this movement is correctly detected as the movement to the left. On the contrary, when the extremal value shown in FIG. 3A moves to the right by one pixel (FIG. 3C), the frame difference $\Delta F$ becomes positive and the sampling difference $\Delta E$ becomes positive with respect to the pixel b. Therefore, this movement is erroneously detected as the movement to the left in spite of the fact that it is the movement to the right.

On one hand, in case of the V-shaped extremal value which is protruded downwardly, the frame difference $\Delta F$ becomes negative and the sampling difference $\Delta E$ also becomes negative in any case where the extremal value moves to the right or left. Therefore, the movement is erroneously decided as the movement to the left in spite of the the fact that the true movement direction is the right direction.

In a general television signal, extremal values exist at many locations; thus, the degradation of precision in the moving direction due to the influence of the extremal value causes a problem which cannot be ignored.

Further, the foregoing conventional movement detecting apparatus has a drawback such that an error of the movement detection becomes large in the case where the movement is large or the gradient of the edge of the moving object is steep.

FIG. 4A shows the case where the movement v from the position of the previous frame indicated by broken lines to the left position indicated by solid lines occurs. In FIG. 4A, the integrating operation of the frame difference $\Delta F$ is performed by the adder/subtracter during the interval where the sampling difference $\Delta E$ in the current frame is not 0 ( $\Delta E \neq 0$), while the integrating operation of the frame difference $\Delta F$ is not executed by the adder/subtracter during the interval where ( $\Delta E = 0$). Therefore, the portions other than the hatched portions with vertical lines do not contribute to the area of the frame difference, causing the precision in the movement detection to deteriorate. In particular, the detection error when the movement amount is large becomes large.

To solve this problem, there is considered a method whereby not only the sampling difference in the current frame but also the sampling difference in the previous frame are used and the adder/subtracter is controlled by an OR output of both of those sampling differences. According to this method as well, as shown in FIG. 4B, the portion which does not contribute to the area of the frame difference is caused. Consequently, in case of the large movement, the movement amount detected is relatively smaller than the actual movement amount.

Further, even in case of the small movement, if the gradient is steep as shown in FIG. 4C, the frame difference hardly contributes to the area, so that an error occurs.

OBJECT AND SUMMARY OF THE INVENTION

It is therefore an object of the present invention to provide an apparatus for detecting a movement of a television signal which can solve the problem of deterioration in precision of the movement detection by way of the non-stationary portion such as an extremal value.

Another object of the invention is to provide an apparatus for detecting a movement of a television signal in which even when the movement is large or the gradient is steep, the precision of the movement detection is not degraded.

Namely, this invention relates to an apparatus for detecting a movement of a television signal, provided with at least two movement detecting apparatuses each comprising: delay and arithmetic operating means 7 and 10 for generating a frame difference $\Delta F$ between the current frame and the previous frame of a digital television signal; delay and arithmetic operating means for generating a gradient $\Delta E$ ($\Delta L$) of the digital television signal; an adder/subtracter which constitutes integrating means for integrating the frame difference; means for dividing an output of the integrating means by the integration value of the absolute value of the gradient $\Delta E$ ($\Delta L$) of the digital television signal; and means for controlling the state of addition or subtraction of the adder/subtracter in conjunction with the sign of the gradient $\Delta E$ of the digital television signal, wherein one of the movement detecting apparatuses detects the gradient $\Delta EL$ ($\Delta LU$) between the current and previous pixels by way of delay and arithmetic operating means 2, 5, 8, and 11 (2, 3, 6, 13), and the other movement detecting apparatus detects the gradient $\Delta ER$ ($\Delta LD$) between the current and post pixels by way of delay and arithmetic operating means 2, 5, and 12 (2, 4, 5, 14), and there are provided means 28 (48) and 29 (49) for selectively outputting respective movement outputs of those two movement detecting apparatuses in dependence on the direction of the movement or information relative thereto.

This invention further relates to a movement detecting apparatus comprising: delay and arithmetic operating means 102 and 103 for generating a frame difference $\Delta F$ between the current frame and the previous frame of a digital television signal; delay and arithmetic operating means 104 and 105 (106, 107) for generating a gradient $\Delta E$ ($\Delta L$) of the digital television signal; an adder/subtracter 111 (121) which constitutes integrating means for integrating the frame difference $\Delta F$; means 114 (124) for dividing an output of the integrating means by the integration value of the absolute value of the gradient $\Delta E$ ($\Delta L$) of the digital television signal; and means 113 (123) for holding the state of addition or subtraction of the adder/subtracter 111 (121) into the arithmetic operation state of the previous time until there occurs a change of sign indicative of the polarity of the gradient $\Delta E$ ($\Delta L$) of the digital television signal.

There are independently provided two movement detecting apparatuses which use the gradient $\Delta EL$ on the left side and the gradient $\Delta ER$ on the right side as gradients, and the output of the movement detecting apparatus which correctly detects the direction of the movement in case of an extremal value is selectively taken out. With regard to not only the horizontal direction but also the vertical direction, there are independently provided two movement detecting apparatuses which use the upper gradient $\Delta LU$ and lower gradient $\Delta LD$, and the output of the movement detecting apparatus which correctly detects the direction of the movement is selected from between the outputs of the respective movement detecting apparatuses. This selection can be performed by comparing the absolute values of the outputs of the two movement detecting apparatuses or by checking the signs of the outputs of the two movement detecting apparatuses.

Further, the state of addition or subtraction is held into the arithmetic operation state which is one sample (one line) before by the control circuit 113 (123) until the change of the sign of the gradient of the digital television signal occurs. Therefore, the area to calculate the movement amount is derived by way of the integration value of the frame difference without losing the area. The movement detection can be performed with a high degree of precision even in any cases where the gradient is steep and the movement is large.

The above and other objects, features and advantages of the present invention will be more apparent from the following detailed description in conjunction with the accompanying drawings.

BRIEF DESCRIPTION OF THE DRAWINGS

FIGS. 1A to 1D are schematic diagrams which are used to explain the movement detection by way of a gradient method;

FIGS. 3A to 3C and 4A to 4C are schematic diagrams which are used to explain problems in a conventional movement detecting apparatus;

FIG. 5, comprising

DETAILED DESCRIPTION OF PREFERRED EMBODIMENTS

One embodiment of the present invention will now be described in detail hereinbelow with reference to the drawings.

Figure 5A:
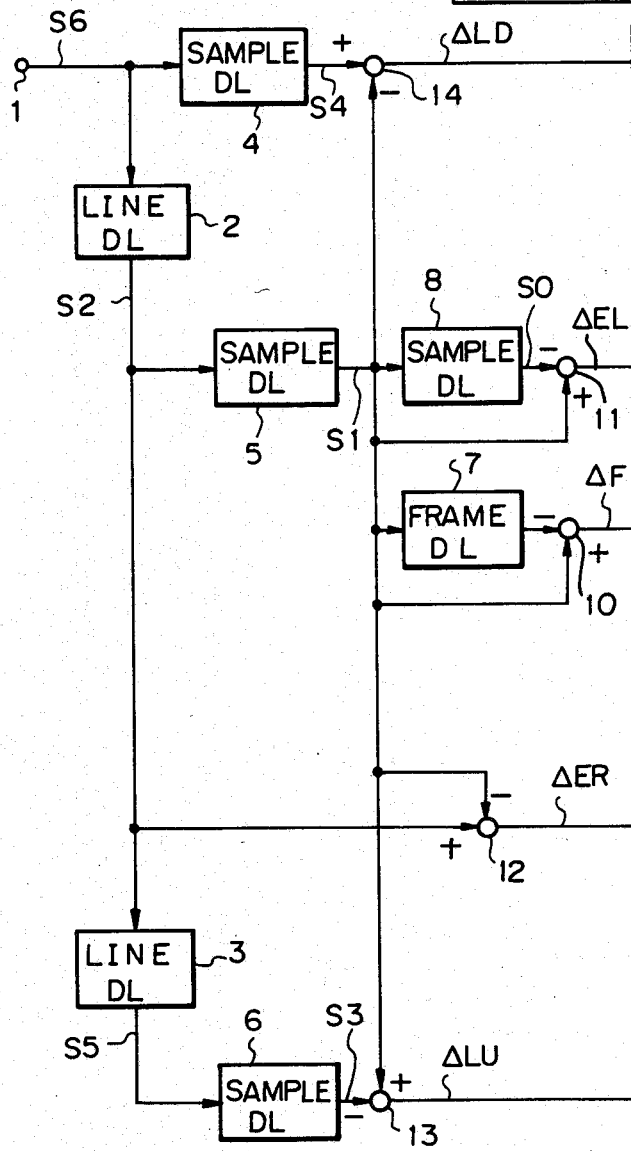
FIGS. 5A and 5B, are block diagrams showing one embodiment of the present invention.
Figure 5B:
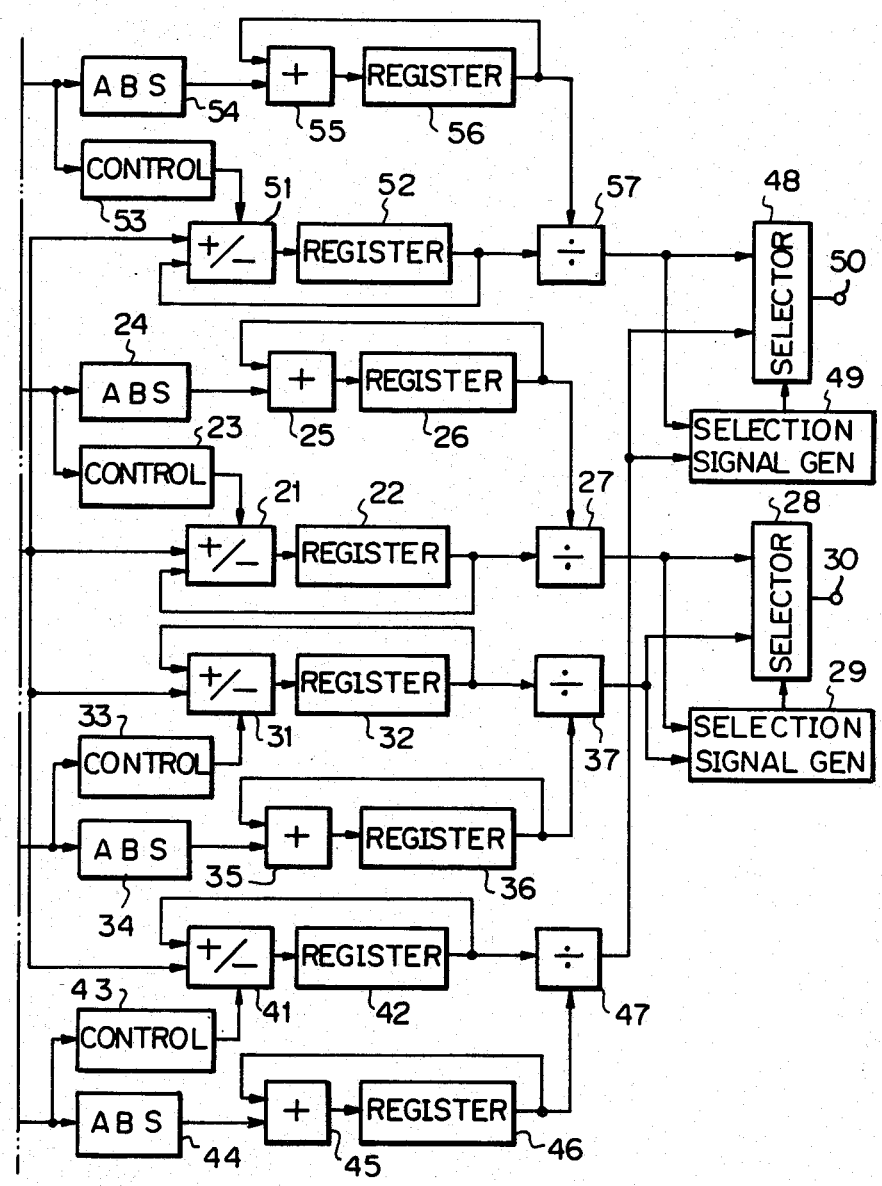

In FIG. 5, an input terminal 1 of a digital television signal is provided. The input signal is supplied to the cascade connection of line delay circuits 2 and 3 each having a delay amount of one line, respectively, and is also supplied to a sample delay circuit 4 having a delay amount of one sampling period. A sample delay circuit 5 is connected to an output of the line delay circuit 2. A sample delay circuit 6 is connected to an output of the line delay circuit 3. A frame delay circuit 7 and a sample delay circuit 8 are connected to an output of the sample delay circuit 5.

An output of the sample delay circuit 5 corresponds to the current pixel whose movement is detected. The output of the sample delay circuit 5 and an output of the frame delay circuit 7 are supplied to a subtracter 10. The corresponding pixel in the previous frame is subtracted from the pixel in the current frame and the frame difference $\Delta F$ is fetched as an output of the subtracter 10.

Figure 2:
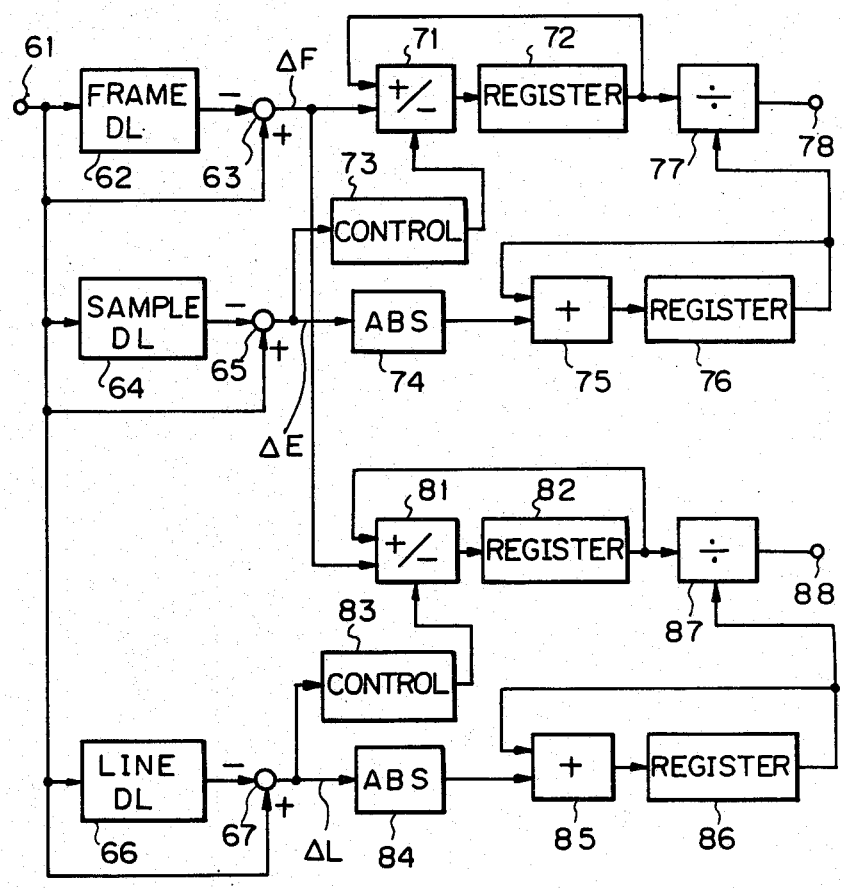
FIG. 2 is a block diagram of a conventional movement detecting apparatus.
Figure 4A:
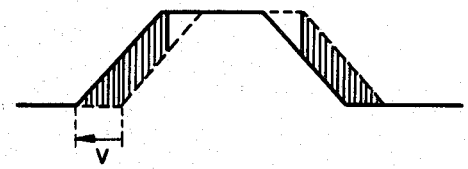
Figure 4B:
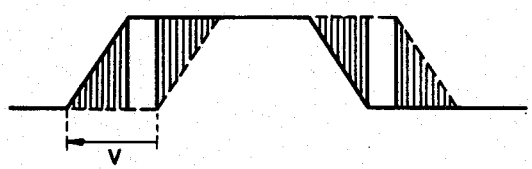
Figure 4C:
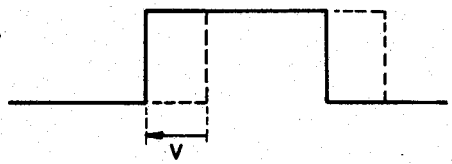
Figure 6:
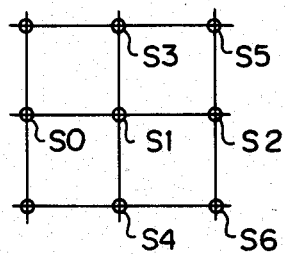
FIGS. 6 to 8 are schematic diagrams which are used to explain one embodiment of the invention.

Assuming that the current pixel is $S_1$, the pixel near the current pixel $S_1$ is used to detect the gradients regarding the horizontal and vertical directions. The detection of those gradients are performed with respect to both cases between the current pixel and the previous pixel and between the current pixel and the subsequent pixel. FIG. 6 shows the pixels near the current pixel $S_1$. When the pixel $S_6$ is supplied to the input terminal 1, the output of the line delay circuit 2 corresponds to the pixel $S_2$ of one line before. The output of the line delay circuit 3 corresponds to the pixel $S_5$ of two lines before. The output of the sample delay circuit 4 corresponds to the pixel $S_4$ of one sample before.

Therefore, the current pixel $S_1$ of one sample before the pixel $S_2$ is generated in the output of the sample delay circuit 5. The pixel $S_0$ of one sample before the current pixel $S_1$ is generated in the output of the sample delay circuit 8. On one hand, the pixel $S_4$ of one line after the current pixel $S_1$ is generated in the output of the sample delay circuit 4. The pixel $S_3$ of one line before the current pixel $S_1$ is generated in the output of the sample delay circuit 6.

The gradient in the horizontal direction is derived by subtracters 11 and 12. Namely, in the subtracter 11, the pixel $S_0$ of one sample before is subtracted from the current pixel $S_1$ and the sampling difference $\Delta EL$ on the left side is generated in the output of the subtracter 11. In the subtracter 12, the current pixel $S_1$ is subtracted from the pixel $S_2$ of one sample after and the sampling difference $\Delta ER$ on the right side is generated in the output of the subtracter 12.

The gradient in the vertical direction is obtained by subtracters 13 and 14. Namely, in the subtracter 13, the pixel $S_3$ of one line before is subtracted from the current pixel $S_1$ and the line difference $\Delta LU$ on the upper side is generated in the output of the subtracter 13. In the subtracter 14, the current pixel $S_1$ is subtracted from the pixel $S_4$ of one line after and the line difference $\Delta LD$ on the lower side is generated in the output of the subtracter 14.

There are independently provided four circuit systems to perform the movement detection by use of total four gradients consisting of the gradients $\Delta EL$ and $\Delta ER$ before and after the current pixel regarding the horizontal direction and the gradients $\Delta LU$ and $\Delta LD$ before and after the current pixel with respect to the vertical direction.

The frame difference $\Delta F$ derived in the output of the subtracter 10 is supplied to four first to fourth integrators. The first integrator consists of an adder/subtracter 21 and a register 22 to which an output of the adder/subtracter 21 is supplied. The frame difference $\Delta F$ and an output of the register 22 are supplied to the adder/subtracter 21. The second integrator comprises an adder/subtracter 31 and a register 32 to which an output of the adder/subtracter 31 is supplied. The frame difference $\Delta F$ and an output of the register 32 are supplied to the adder/subtracter 31. The third integrator comprises an adder/subtracter 41 and a register 42 to which an output of the adder/subtracter 41 is supplied. The frame difference $\Delta F$ and an output of the register 42 are supplied to the adder/subtracter 41. The fourth integrator comprises an adder/subtracter 51 and a register 52 to which an output of the adder/subtracter 51 is supplied. The frame difference $\Delta F$ and an output of the register 52 are supplied to the adder/subtracter 51.

The adder/subtracter 21 is controlled so as to perform the arithmetic operation of either addition or subtraction in response to an output of a control circuit 23. The sampling difference $\Delta EL$ from the subtracter 11 is supplied to the control circuit 23. The control circuit 23 controls the adder/subtracter 21 so as to perform the adding operation when the sampling difference $\Delta EL$ has a positive sign and to perform the subtracting operation when the sampling difference $\Delta EL$ has a negative sign. The adder/subtracter 31 performs the arithmetic operation of either addition or subtraction in response to an output of a control circuit 33. The sampling difference $\Delta ER$ is supplied from the subtracter 12 to the control circuit 33. The control circuit 33 controls the adder/subtracter 31 so as to perform the adding operation when the sampling difference $\Delta ER$ has a positive sign and to perform the subtracting operation when the sampling difference $\Delta ER$ has a negative sign.

The adder/subtracter 41 performs the arithmetic operation of either addition or subtraction in response to an output of a control circuit 43. The line difference $\Delta LU$ is supplied from the subtracter 13 to the control circuit 43. The control circuit 43 controls the adder/subtracter 41 so as to perform the adding operation when the line difference $\Delta LU$ has a positive sign and to perform the subtracting operation when the line difference $\Delta LU$ has a negative sign.

The sampling difference $\Delta EL$ is supplied to a converter 24 and is converted to the absolute value and is supplied to one input of an adder 25 for integration. An output of the adder 25 is supplied to a register 26 and an output of the register 26 is supplied to the other input of the adder 25, so that the integration value of the absolute value of the sampling difference $\Delta EL$ is fetched as the output of the register 26. The sampling difference $\Delta ER$ is supplied to a converter 34 and is converted to the absolute value and is supplied to one input of an adder 35 for integration. An output of the adder 35 is supplied to a register 36 and an output of the register 36 is supplied to the other input of the adder 35, so that the integration value of the absolute value of the sampling difference $\Delta ER$ is fetched as the output of the register 36.

The line difference $\Delta LU$ is supplied to a converter 44 and is converted to the absolute value and is supplied to one input of an adder 45 for integration. An output of the adder 45 is supplied to a register 46 and an output of the register 46 is supplied to the other input of the adder 45, so that the integration value of the absolute value of the line difference $\Delta LU$ is fetched as the output of the register 46. The line difference $\Delta LD$ is supplied to a converter 54 and is converted to the absolute value and is supplied to one input of an adder 55 for interation. An output of the adder 55 is supplied to a register 56 and an output of the register 56 is supplied to the other input of the adder 55, so that the integration value of the absolute value of the line difference $\Delta LD$ is fetched as the output of the register 56.

The horizontal movement $v_1$ is obtained by dividing the result of addition or subtraction of the frame difference $\Delta F$ in the movement region by the integration value of the absolute value of the sampling difference $\Delta EL$ or $\Delta ER$ by use of a divider 27 or 37. On the other hand, the vertical movement $v_2$ is derived by dividing the result of addition or subtraction of the frame difference $\Delta F$ in the movement region by the integration value of the absolute value of the line difference $\Delta LU$ or $\Delta LD$ by use of a divider 47 or 57.

The movement output detected from the divider 27 by use of the leftward sampling difference $\Delta EL$ is supplied to a selector 28 and a selection signal generator 29. The movement output detected from the divider 37 by use of the rightward sampling difference $\Delta EL$ is supplied to the selector 28 and the selection signal generator 29. The selector 28 is controlled by a selection signal from the generator 29. An output signal of the selector 28 is fetched as the horizontal movement output $v_1$ from an output terminal 30. For the movement output $v_1$, its sign bit indicates the movement direction and its value represents the movement amount.

The movement output detected from the divider 47 by use of the upward line difference $\Delta LU$ is supplied to a selector 48 and a selection signal generator 49. The movement output detected from the divider 47 by use of the downward line difference $\Delta LD$ is supplied to the selector 48 and the selection signal generator 49. The selector 48 is controlled by a selection signal from the generator 49. An output signal of the selector 48 is fetched as the vertical movement output $v_2$ from an output terminal 50. For the movement output $v_2$, its sign bit indicates the movement direction and its value represents the movement amount.

The selection signal generator 29 generates a selection signal to select either output whose absolute value is larger from between the two movement outputs which are supplied to the selector 28, or selects the movement output in accordance with the signs of the two movement outputs which are supplied to the selector 28 (practically speaking, the movement output based on the leftward sampling difference $\Delta EL$ is selected when the sign is positive, while the movement output based on the rightward sampling difference $\Delta ER$ is selected when the sign is negative). The selection signal generator 49 also similarly generates a selection signal to the selector 48.

As mentioned above, two independent movement detecting systems are provided with respect to each of the horizontal and vertical directions and the movement output of each system is selected, thereby making it possible to improve the precision of the movement detection. The reasons of this improvement by way of such an arrangement will then be explained hereinbelow.

Figure 7:
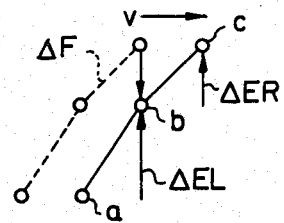

When the object of three pixels indicated by the broken lines in FIG. 7 moves to the right as indicated by the solid lines after one frame, the gradient $\Delta EL$ at point b (current pixel) is derived from the difference between points a and b according to the gradient method. Namely, the rightward movement is calculated from the relation with the frame difference $\Delta F$ using the leftward gradient $\Delta EL$ of the current pixel. For the gradient, the same movement amount can be obtained even by use of the difference $\Delta ER$ between points b and c on the right side of the current pixel since the integration is performed using all pixels.

Figure 8:
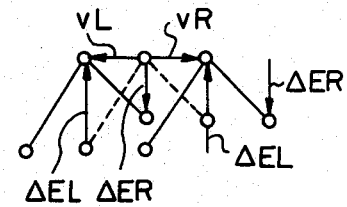

However, in case of an extremal value, the precision remarkably changes in dependence on the use of $\Delta EL$ or $\Delta ER$ as a gradient. In FIG. 8, it is now considered the cases where three pixels including the extremal value indicated by the broken lines move to the left by only one pixel after one frame (movement amount $v_L$) and where these three pixels move to the right by only one pixel after one frame (movement amount $v_R$). In such cases, the frame difference $\Delta F$ becomes positive irrespective of the movement direction.

In case of the leftward movement, this movement is correctly detected as the leftward movement with a high degree of accuracy by use of the leftward sampling difference $\Delta EL$. However, if the rightward sampling difference $\Delta ER$ is used, the leftward movement is erroneously determined as the rightward movement since the sampling difference $\Delta ER$ is negative, and the detection precision is also bad. On the contrary, in case of the rightward movement, this movement is accurately detected as the rightward movement with a high degree of precision by use of the rightward sampling difference $\Delta ER$. However, if the leftward sampling difference $\Delta EL$ is used, the rightward movement is erroneously determined as the leftward movement since the sampling difference $\Delta EL$ is positive, and the detecting accuracy is also bad. As described above, the accuracy of the movement detection quite differs in dependence on whether the leftward sampling difference $\Delta EL$ or rightward sampling difference $\Delta ER$ is used as the gradient with regard to the movement direction.

In any cases where the direction of the extremal value is upward and downward, the relations among the sampling differences $\Delta EL$ and $\Delta ER$ and the leftward and rightward movements are as shown in the following table.

| Gradient which is used | Leftward movement | Rightward movement |
|---|---|---|
| $\Delta EL$ | Can be correctly obtained | Erroneously obtained as a small value |
| $\Delta ER$ | Erroneously obtained as a small value | Can be correctly obtained |

In the foregoing embodiment of the present invention, there are provided two movement detecting systems which use both $\Delta EL$ and $\Delta ER$ with regard to the horizontal direction, and the correct movement output is selected by the selector 28, so that the movement detection can be performed with a high degree of accuracy. As will be understood from the above table, the selector 28 selects the movement output whose absolute value is larger or selects the movement output in response to the sign in such a manner that the movement output of the system using $\Delta EL$ is selected when the movement output has a positive sign and the movement output of the system using $\Delta ER$ is selected when the movement output has a negative sign.

With respect to the vertical movement as well, similarly to the horizontal direction, the correct movement output is selected by the selector 48 from the movement outputs of the two systems which use both of the line differences $\Delta LU$ and $\Delta LD$ as the gradients.

The present invention may be applied to the one-dimensional movement detection to detect the movement in only one of the horizontal and vertical directions. In addition, the invention can be also applied to a movement detecting apparatus in which the representative points for every predetermined number of pixels are used without using all pixels.

As described above, each of the control circuits 23, 33, 43, and 53 to control the adder/subtracter to integrate the frme difference is not limited to the foregoing arrangement such that the adder/subtracter is simply controlled in dependence on the sign of the gradient, but may be constituted such as to hold the state of the previous time until this sign is inverted. According to this constitution, the degradation of the precision of the movement detection can be prevented even in the case where the movement amount is large or in case of an object having a steep gradient.

Another embodiment of the present invention will then be described hereinbelow with reference to the drawings.

Figure 9:
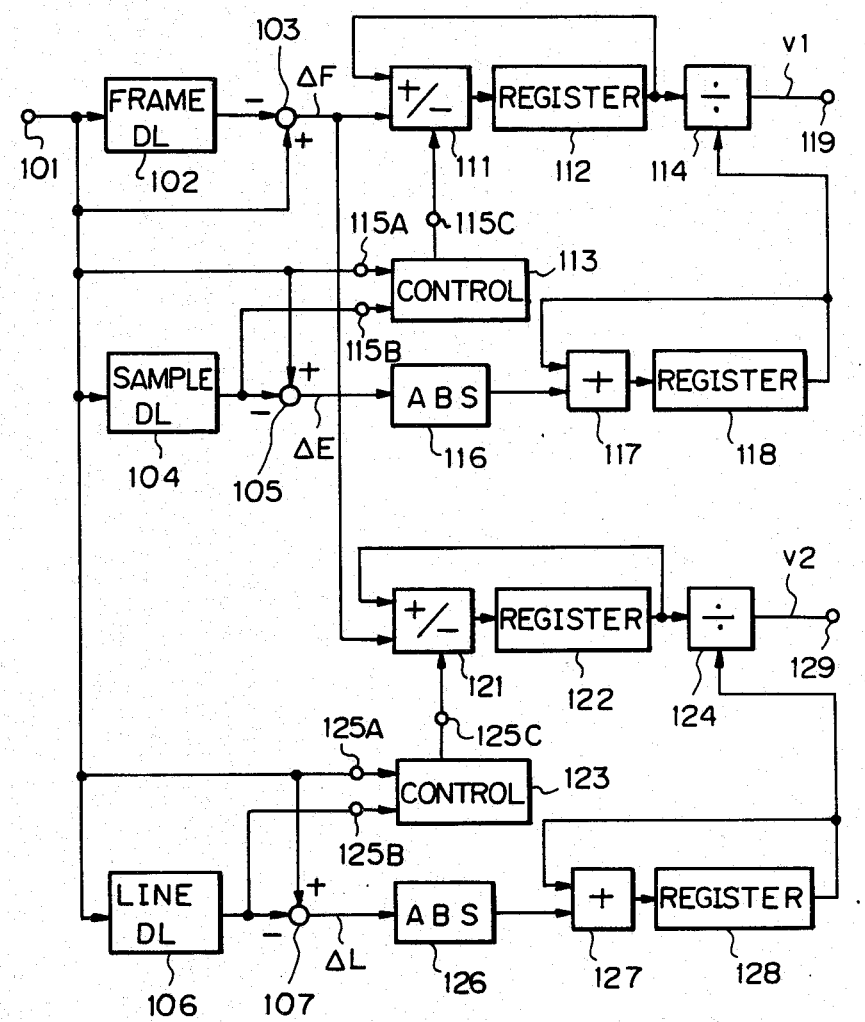
FIG. 9 is a block diagram showing another embodiment of the invention.

FIG. 9 is a block diagram showing an arrangement of another embodiment of the present invention. In FIG. 9, a digital television signal is supplied to an input terminal 101. This digital television signal is supplied to a frame delay circuit 102 having a delay amount of one frame, a sample delay circuit 104 having a delay amount of one sampling period, and a line delay circuit 106 having a delay amount of one line.

An output (pixel in the previous frame) of the frame delay circuit 102 is subtracted from the input digital television signal by a subtracter 103, so that the frame difference $\Delta F$ is generated from an output of the subtracter 103. An output (pixel of the previous sample) of the sample delay circuit 104 is subtracted from the input digital television signal by a subtracter 105, so that the sampling difference $\Delta E$ is generated from an output of the subtracter 105. An output (pixel of the previous line) of the line delay circuit 106 is subtracted from the input digital television signal by a subtracter 107, so that the line difference ΔL is generated from an output of the subtracter 107.

The frame difference ΔF is supplied to two integrators. One integrator comprises an adder/subtracter 111 and a register 112. The frame difference ΔF and an output of the register 112 are supplied to the adder/subtracter 111. The other integrator comprises an adder/subtracter 121 and a register 122. The frame difference ΔF and an output of the register 122 are supplied to the adder/subtracter 121. The frame difference ΔF is supplied to the adders/subtracters 111 and 121 of those integrators.

The adder/subtracter 111 performs the arithmetic operation of either addition or subtraction in response to a control signal which is generated from an output terminal 115C of a control circuit 113. Namely, the adder/subtracter 111 porforms the adding operation when the control signal is at a high level, while the adder/subtracter 111 performs the subtracting operation when the control signal is at a low level. The data of the current pixel of the digital television signal is supplied from the input terminal 101 to one input terminal 115A of the control circuit 113, while the output data (previous pixel) of the sample delay circuit 104 is supplied to the other input terminal 115B.

The adder/subtracter 121 performs the arithmetic operation of either addition or subtraction in response to a control signal which is generated from an output terminal 125C of a control circuit 123. Namely, the adder/subtracter 121 performs the adding operation when the control signal is at a high level, while the adder/subtracter 121 performs the subtracting operation when the control signal is at a low level. The data of the current pixel of the digital television signal is supplied from the input terminal 101 to one input terminal 125A of the control circuit 123, while the output data (previous pixel) of the line delay circuit 106 is supplied to the other input terminal 125B.

The control circuit 113 holds the state of the control signal into the state of one sample before until the sign of the sampling difference ΔE is inverted as will be explained later. Similarly, the control circuit 123 holds the state o the control signal into the state of one line before until the sign of the line difference ΔL is inverted as will be explained later.

The sampling difference ΔE which is outputted from the subtracter 105 is supplied to a converter 116 and is converted to the absolute value and is supplied to one input of an adder 117 for integration. An output of the adder 117 is supplied to a register 118 and an output of the register 118 is supplied to the other input of the adder 117, so that the integration value of the absolute value of the sampling difference ΔE is fetched as the output of the register 118.

The line difference ΔL from the subtracter 107 is supplied to a converter 126 and is converted to the absolute value and is supplied to one input of an adder 127 for integration. An output of the adder 127 is supplied to a register 128 and an output of the register 128 is supplied to the other input of the adder 127, so that the integration value of the absolute value of the line difference ΔL is fetched as the output of the register 128.

As described above, the horizontal movement $v_1$ is obtained by dividing the result of addition or subtraction of the frame difference ΔF in the movement region by the integration value of the absolute value of the sampling difference ΔE by a divider 114 The movement output $v_1$ can be obtained from an output terminal 119. On the other hand, the vertical movement $v_2$ is derived by dividing the result of addition or subtraction of the frame difference ΔF in the movement region by the integration value of the absolute value of the line difference ΔL by a divider 124. The movement output $v_2$ can be derived from an output terminal 129.

Figure 10:
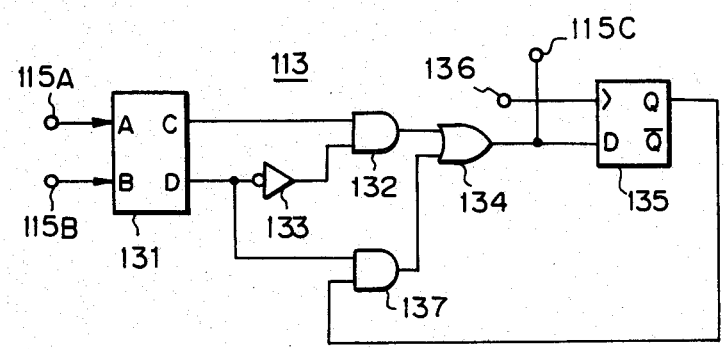
FIG. 10 is a block diagram of a control circuit for the horizontal movement detection in another embodiment of the invention.

FIG. 10 shows a practical arrangement of the control circuit 113 in another embodiment of the invention. The data of the current pixel from the input terminal 115A and the data of the pixel of one sample before from the input terminal 115B are supplied as two inputs A and B of a comparator 131. One output C of the comparator 131 becomes a high level when A is larger than B, while the other output D becomes a high level when A equals B.

The output C of the comparator 131 is supplied to one input of an AND gate 132, while the output D of the comparator 131 is supplied to the other input of the AND gate 132 through an inverter 133. An output of the AND gate 132 is supplied to an OR gate 134. An output of the OR gate 134 is fetched from the output terminal 115C and is supplied to a D flip-flop 135. An output of the D flip-flop 135 and the output D of the comparator 131 are supplied to an AND gate 137. An output of the AND gate 137 is supplied to the other input of the OR gate 134. A sampling clock is supplied from a terminal 136 to the D flip-flop 135. The delay of one sampling period is generated by way of the D flip-flop 135.

Although not shown, at the first position of each line, the state of the D flip-flop 135 is set to the same state at the first position of the previous line. This constitution is needed to set the control signal to the adder/subtracter 111 into the correct state as possible by use of the correlation between lines since it is unclear that into which state of a high level or a low level the control signal should be set when the sampling difference ΔE is 0 at the start position of the line.

Figure 12A:
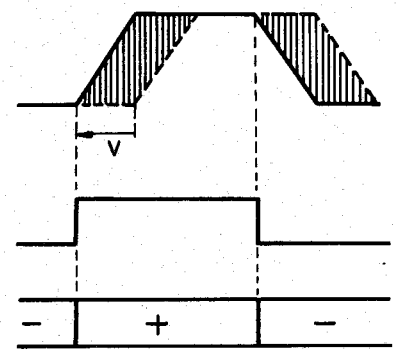
FIGS. 12A to 12C and 13A to 13C are schematic diagrams which are used to explain the operation of another embodiment of the invention.

The operation of the control circuit 113 when the leftward movement occurs as shown in FIG. 12A will now be described. Among the gradients of the current frame indicated by the solid lines, A is larger than B during the interval when the sampling difference ΔE is positive and the frame difference ΔF is also positive, so that the output C of the comparator 131 becomes a high level and the output D becomes a low level. Therefore, the output of the AND gate 132 becomes a high level and the output of the OR gate 134 also becomes a high level. The adder/subtracter 111 performs the adding operation in response to the output (namely, control signal) of the OR gate 134 and at the same time an output Q of the D flip-flop 135 becomes a high level.

Since A equals B during the interval where the sampling difference ΔE is 0, the output C of the comparator 131 becomes a low level and the output D becomes a high level. Thus, the output of the AND gate 132 becomes a low level, but the output of the AND gate 137 is held at a high level and the control signal is kept at a high level. During the interval of the gradient where the sampling difference ΔE is negative and the frame difference ΔF is negative, both of the outputs C and D of the comparator 131 become a low level, so that the control signal which is outputted from the OR gate 134 becomes a low level. Due to this, the adder/subtracter 111 is switched to such a state that the subtracting operation is performed.

Figure 12B:
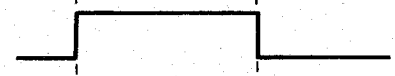
Figure 12C:
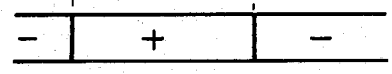

FIG. 12B shows the control signal which is outputted from the OR gate 134. FIG. 12C shows the operation of the adder/subtracter 111 based on this control signal The control signal becomes a high level after it became a low level in the case where the positive gradient occurs. In this way, the control circuit 113 allows the frame difference ΔF to contribute to the hatched areas indicated with vertical lines in FIG. 12A, so that the degradation of the precision of the movement detection can be prevented.

Figure 13A:
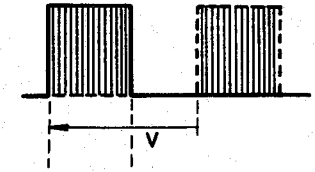
Figure 13B:
Figure 13C:
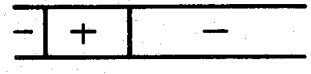

On the other hand, as shown in FIG. 13A, even in the case of the movement v having the steep gradients in which the position in the previous frame (indicated by the broken lines) and the position in the current frame (indicated by the solid lines) do not overlap with each other at all, a control signal shown in FIG. 13B can be generated. As shown in FIG. 13C, the operation of the adder/subtracter 111 can be controlled and the frame difference can be accurately added or subtracted.

Figure 11:
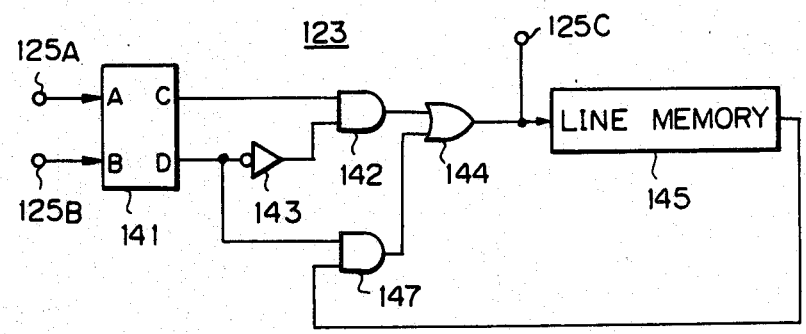
FIG. 11 is a block diagram of a control circuit for the vertical movement detection in another embodiment of the invention.

FIG. 11 shows a practical arrangement of the control circuit 123 in another embodiment of the invention. The data of the current pixel from the input terminal 125A and the data of the previous line from the input terminal 125B are supplied as two inputs A and B of a comparator 141. One output C of the comparator 141 becomes a high level when A is larger than B, while the other output D becomes a high level when A equals B.

The output C of the comparator 141 is supplied to one input of an AND gate 142, while the output D of the comparator 141 is supplied to the other input of the AND gate through an inverter 143. An output of the AND gate 142 is supplied to one input of an OR gate 144. An output of the OR gate 144 is fetched as a control signal from the output terminal 125C and is also supplied to a line memory 145. The control signal of one line before which is outputted from the line memory 145, and the output D of the comparator 141 are supplied to an AND gate 147. An output of the AND gate 147 is supplied to the other input of the OR gate 144.

In a similar manner as the foregoing control circuit 113, the control circuit 123 holds the state of the control signal into the state of the previous time until the sign of the gradient (line difference) ΔL is inverted, thereby making it possible to improve the accuracy of the vertical movement detection.

Although not shown, the control circuit 123 is initialized by use of the correlation between frames. Namely, the content of the line memory 145 corresponds to the top line and is set to the same content as the top line in the previous frame.

According to the present invention, with respect to the extremal value having no stationary property, the movement detection can be also accurately performed; therefore, the precision of the movement detection can be remarkably improved.

On one hand, according to the present invention, even in case of a large movement or in the case where an object having steep gradients moves as well, it is possible to solve the problems such that the ratio at which the integrated frame difference ΔF can contribute to the frame difference area is small or the frame difference ΔF cannot contribute to the frame difference area. Moreover, the movement detection can be performed with a high degree of accuracy.

Although the present invention has been shown and described with respect to preferred embodiments, various changes and modifications which are obvious to a person skilled in the art to which the invention pertains are deemed to lie within the spirit and scope of the invention.

What is claimed is:

1. An apparatus for detecting a movement of a television signal comprising: horizontal movement detecting means having means for integrating a frame difference signal (ΔF) obtained by subtracting an image signal of one frame before from an image signal in the current frame of a television signal in a movement region, first addition/subtraction control means for controlling an adding or subtracting operation of said frame difference signal (ΔF) integrating means in accordance with a positive or negative sign of a differential horizontal pixel signal (ΔE) derived by subtracting an intensity value of a pixel horizontally adjacent to a predetermined pixel in said current frame image signal from an intensity value of said predetermined pixel, means for integrating an absolute value of said differential horizontal pixel signal (ΔE), and first dividing means for dividing an output signal of said frame difference signal (ΔF) integrating means by an output signal of said integrating means of the absolute value of said differential horizontal pixel signal (ΔE), said horizontal movement detecting means detecting an output signal of said first dividing means as a movement amount of the image in the horizontal direction; and vertical movement detecting means having second addition/subtraction control means for controlling an adding or subtracting operation of said frame difference signal (ΔF) integrating means in accordance with a positive or negative sign of a differential vertical pixel signal (ΔL) derived by subtracting an intensity value of a pixel vertically adjacent to said predetermined pixel in said current frame image signal from the intensity value of said predetermined pixel, and second dividing means for dividing the output signal of said frame difference signal (ΔF) integrating means by an output signal of the integrating means of the absolute value of said differential vertical pixel signal (ΔL), said vertical movement detecting means detecting an output signal of said second dividing means as a movement amount of the image in the vertical direction, wherein said horizontal movement detecting means has first and second horizontal movement detecting means (21, 22, 23, 24, 25, 26, 27; 31, 32, 33, 34, 35, 36, 37) for detecting first and second horizontal movements in accordance with respective differential horizontal pixel signals (ΔEL, ΔER) between said predetermined pixel ($S_1$) and a pixel ($S_0$) which is one pixel before said predetermined pixel ($S_1$) and between said predetermined pixel ($S_1$) and a pixel ($S_2$) which is one pixel after said predetermined pixel ($S_1$), and selecting means which is controlled in dependence on the magnitudes of output signals of said first and second horizontal movement detecting means or on the signs indicative of positive or negative of said output signals of said first and second horizontal movement detecting means and which selectively takes out one of the output signals of the first and second horizontal movement detecting means, and said vertical movement detecting means has first and second vertical movement detecting means (41, 42, 43, 44, 45, 46, 47; 51, 52, 53, 54, 55, 56, 57) for detecting first and second vertical movements in accordance with respective differential vertical pixel signals (ΔLU, ΔLD) between said predetermined pixel ($S_1$) and a pixel ($S_3$) which is one line before said predetermined pixel ($S_1$) and between said predetermined pixel ($S_1$) and a pixel ($S_4$) which is one line after said predetermined pixel ($S_1$), and selecting means which is controlled in dependence on the magnitudes of output signals of said first and second vertical movement detecting means or on the signs indicative of positive or negative of the output signals of said first and second vertical movement detecting means and which selectively takes out one of said output signals of the first and second vertical movement detecting means.

2. A movement detecting apparatus of a television signal according to claim 1, wherein said first addition/subtraction control means has means for holding the positive or negative sign of said differential horizontal pixel signal ($\Delta E$) until the positive or negative sign of said differential horizontal pixel signal ($\Delta E$) is inverted, and said second addition/subtraction control means has means for holding the positive or negative sign of said differential vertical pixel signal ($\Delta L$) until the positive or negative sign of said differential vertical pixel signal ($\Delta L$) is inverted.

3. An apparatus for detecting a movement of a television signal comprising: horizontal movement detecting means having means for integrating a frame difference signal ($\Delta F$) obtained by subtracting an image signal of one frame before from an image signal in the current frame of a television signal in a movement region, first addition/subtraction control means for controlling an adding or subtracting operation of said frame difference signal ($\Delta F$) integrating means in accordance with a positive or negative sign of a differential horizontal pixel signal ($\Delta E$) derived by subtracting an intensity value of a pixel horizontally adjacent to a predetermined pixel in said current frame image signal from an intensity value of said predetermined pixel, means for integrating an absolute value of said differential horizontal pixel signal ($\Delta E$), and first dividing means for dividing an output signal of said frame difference signal ($\Delta F$) integrating means by an output signal of said integrating means of the absolute value of said differential horizontal pixel signal ($\Delta E$), said horizontal movement detecting means detecting an output signal of said first dividing means as a movement amount of the image in the horizontal direction; and vertical movement detecting means having second addition/subtraction control means for controlling an adding or subtracting operation of said frame difference signal ($\Delta F$) integrating means in accordance with a positive or negative sign of a differential vertical pixel signal ($\Delta L$) derived by subtracting an intensity value of a pixel vertically adjacent to said predetermined pixel in said current frame image signal from the intensity value of said predetermined pixel, and second dividing means for dividing the output signal of said frame difference signal ($\Delta F$) integrating means by an output signal of the integrating means of the absolute value of said differential vertical pixel signal ($\Delta L$), said vertical movement detecting means detecting an output signal of said second dividing means as a movement amount of the image in the vertical direction, wherein said first addition/subtraction control means has means for holding the positive or negative sign of said differential horizontal pixel signal ($\Delta E$) until the positive or negative sign of said differential horizontal pixel signal ($\Delta E$) is inverted, and said second addition/subtraction control means has means for holding the positive or negative sign of said differential vertical pixel signal ($\Delta L$) until the positive or negative sign of said differential vertical pixel signal ($\Delta L$) is inverted.

4. A movement detecting apparatus of a television signal according to claim 3, wherein said means for holding the sign of said differential horizontal pixel signal ($\Delta E$) has a discriminating circuit (131) which discriminates the magnitudes of the intensity value of said predetermined pixel and of the intensity value of the pixel which is horizontally one pixel before said predetermined pixel and generates a first binary output signal of "0" or "1" in accordance with the result of said discrimination and also generates a second binary output signal of "0" or "1" when the difference between the intensity value of said predetermined pixel and the intensity value of the pixel which is horizontally one pixel before said predetermined pixel is substantially 0; a circuit (132, 133, 134) to generate a control signal (115C) in response to said first and second binary output signals; a holding circuit (135) to hold the positive or negative sign of said control signal (115C) within only the interval of one pixel period; and a feedback circuit to feed back an output signal of said holding circuit (135) and a signal which is generated in response to said second binary output signal to said control signal generating circuit (132, 133, 134), and said means for holding the sign of said differential vertical pixel signal ($\Delta L$) has a discriminating circuit (141) which discriminates the magnitudes of the intensity value of said predetermined pixel and of the intensity value of the pixel which is vertically one pixel before said predetermined pixel and generates a third binary output signal of "0" or "1" in accordance with the result of said discrimination and also generates a fourth binary output signal of "0" or "1" when the difference between the intensity value of said predetermined pixel and the intensity value of the pixel which is vertically one pixel before said predetermined pixel is substantially 0; a circuit (142, 143, 144) for generating a control signal (125C) in response to said third and fourth binary output signal; a holding circuit (145) for holding a positive or negative sign of said control signal (125C) within only the interval of one line period; and a feedback circuit to feed back an output signal of said holding circuit (145) and a signal which is generated in response to said fourth binary output signal to said control signal generating circuit (142, 143, 144).

5. A movement detecting apparatus of a television signal according to claim 4, wherein said holding circuit (135) is constituted by a D-type flip-flop and said control signal (115C) is supplied to a D input terminal of said D-type flip-flop and a sampling clock of said horizontal pixel period is supplied to a clock input terminal of said D-type flip-flop, and said holding circuit (145) is constituted by a line memory to store pixel data of one line.

* * * * *